Oct. 3, 1933.  R. A. WILLIAMS  1,928,637
BRAKE FOR WOODWORKING MACHINES
Filed May 19, 1928  3 Sheets-Sheet 1
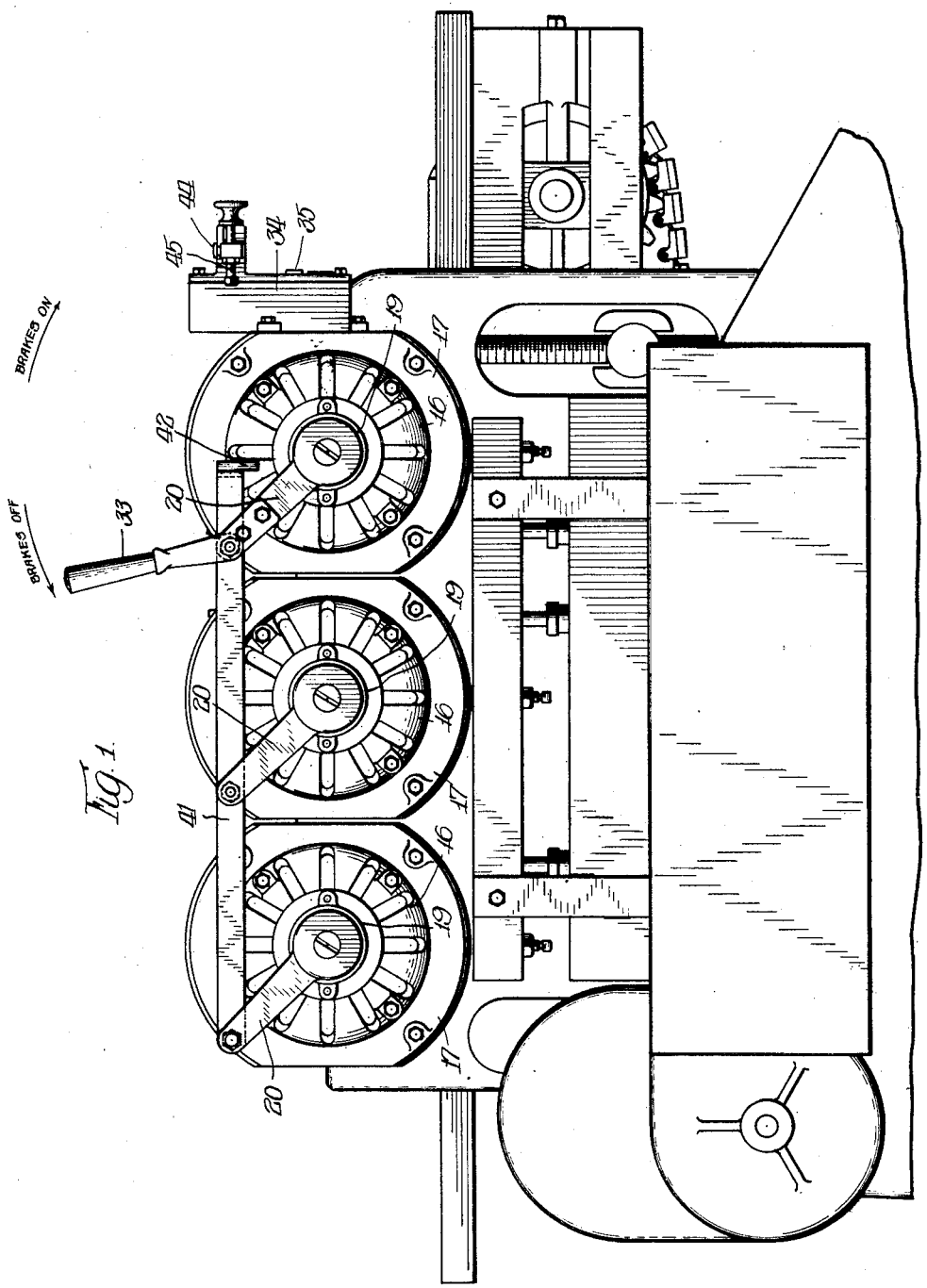
Inventor:
Richard A. Williams,
By Cromwell, Greist & Warden
attys.

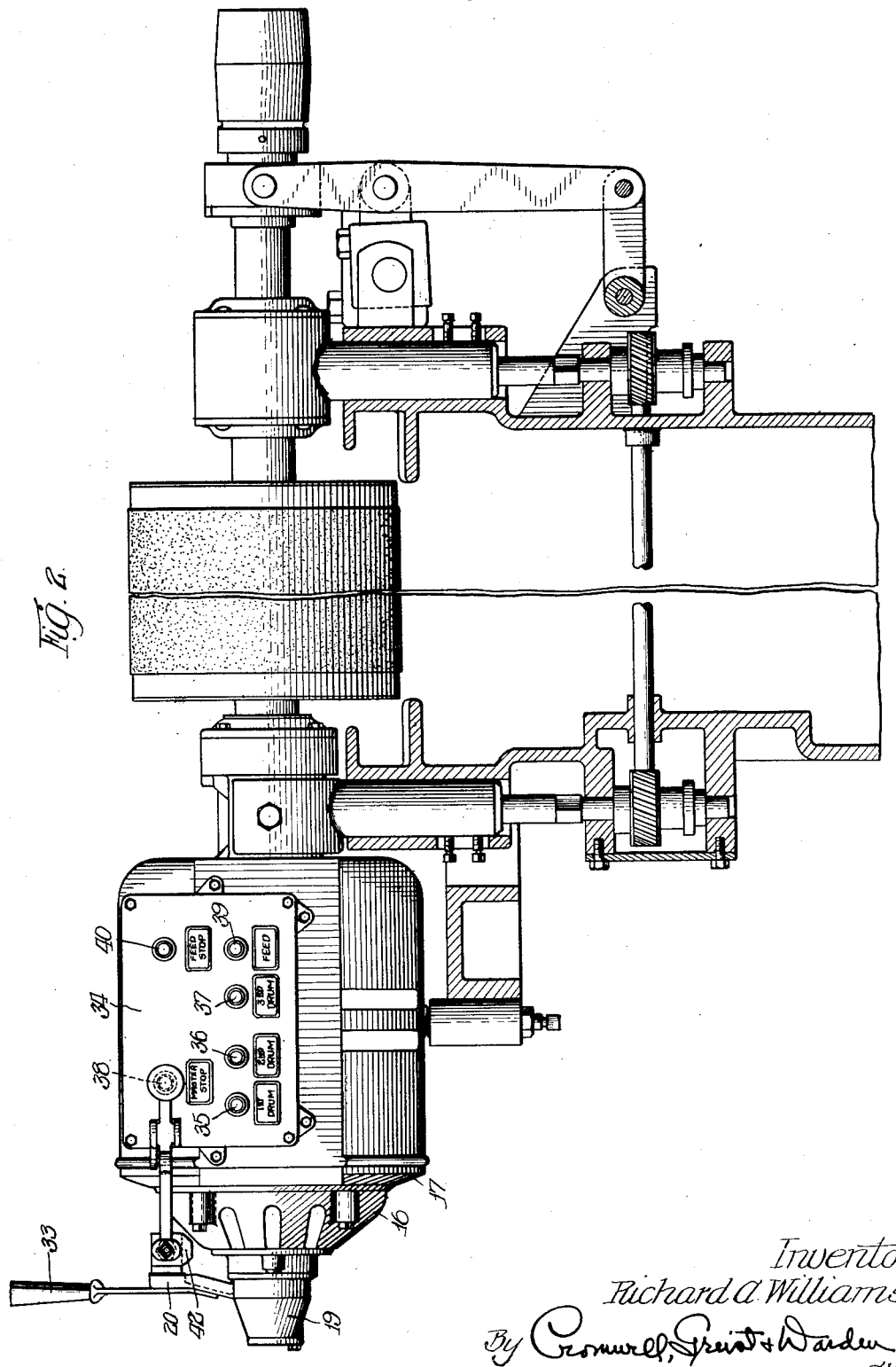

Oct. 3, 1933.  R. A. WILLIAMS  1,928,637
BRAKE FOR WOODWORKING MACHINES
Filed May 19, 1928  3 Sheets-Sheet 3
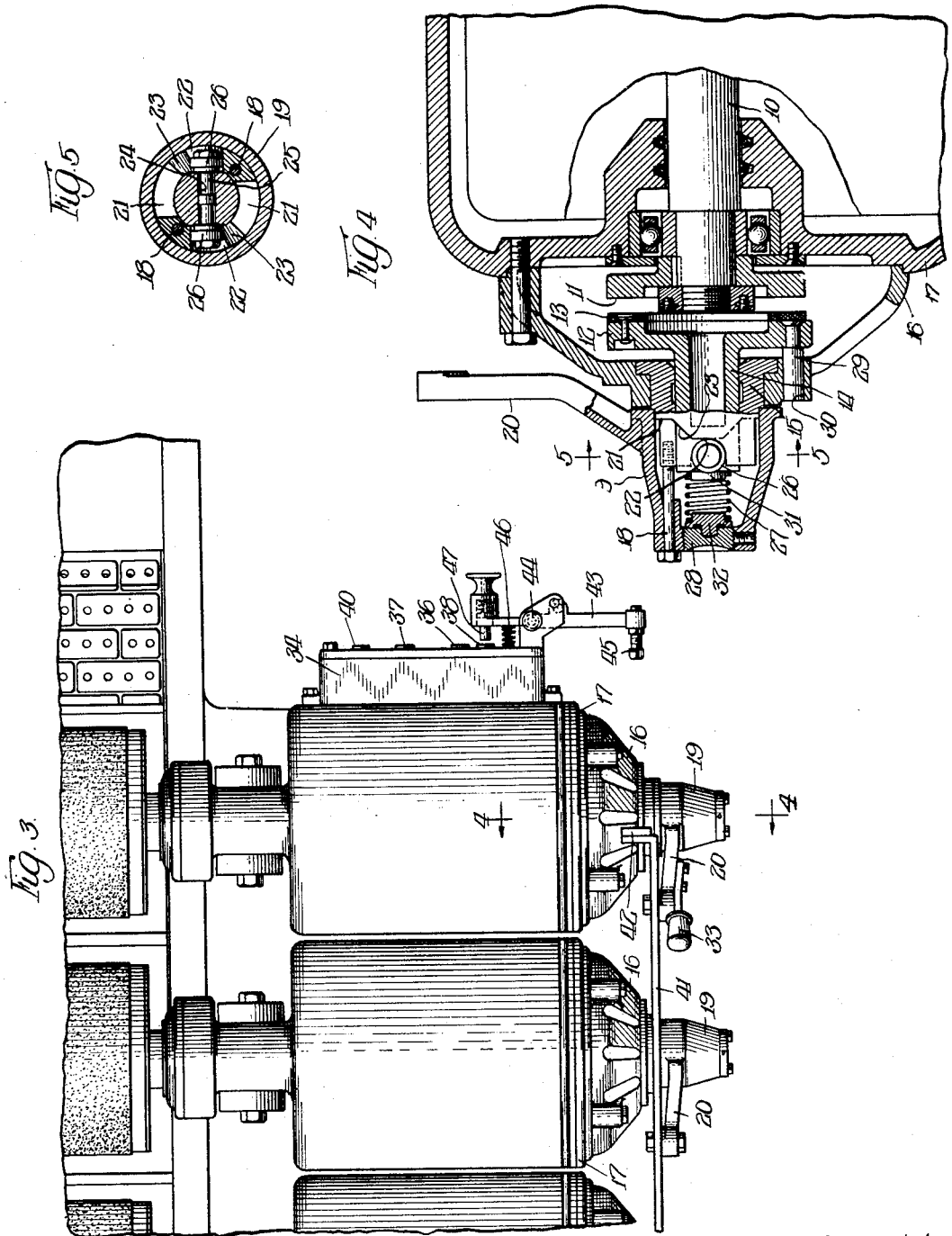
Inventor:
Richard A. Williams,
By Cromwell, Greist & Warden
Attys.

Patented Oct. 3, 1933

1,928,637

UNITED STATES PATENT OFFICE 1,928,637

BRAKE FOR WOODWORKING MACHINES

Richard A. Williams, Beloit, Wis., assignor to Yates-American Machine Company, Beloit, Wis., a corporation of Delaware Application May 19, 1928. Serial No. 278,937

6 Claims. (Cl. 188—166)

The present invention relates to wood working machines, and has to do particularly with a novel braking device for application to such machines. The brake of the invention may be used with many different kinds of wood working machines, but is particularly applicable to a rotating and oscillating drum sander and will therefore be described in such specific association.

One object of the invention is to provide a novel brake which in operation is applied axially to the member which is to be brought to rest.

Another object is to provide a novel brake which can be applied axially to a member which both rotates and oscillates.

Still another object is to provide a novel brake in which the continued application of pressure necessary to effect the braking operation is obtained mechanically rather than manually.

A further object is to provide a novel brake which can be used and operated in multiple.

A still further object is to provide, in association with a brake, a novel control mechanism whereby operation of the brake serves automatically to cut off the power used to drive the rotating member.

While the foregoing statements are indicative in a general way of the nature of the invention, other objects and advantages will be apparent to those skilled in the art upon a full understanding of the construction, arrangement, operation and application of the improved brake.

In the accompanying drawings:

Fig. 1 is a fragmentary side view of a multiple drum sander equipped with a number of brakes constructed in accordance with the invention;

Fig. 2 is a fragmentary end view of the sander, showing portions of the same in section;

Fig. 3 is a fragmentary plan view of the sander;

Fig. 4 is a vertical longitudinal section through the brake associated with one of the drums, taken on the line 4—4 of Fig. 3; and Fig. 5 is a vertical transverse section, taken on the line 5—5 of Fig. 4.

As will be observed in the drawings, the brake of the invention is shown in multiple in association with the motor and drum shafts 10 of a multiple drum sander. Inasmuch as the brakes associated with the several motor and drum shafts of the machine are the same, only one need be described in detail.

The shaft 10 shown in Fig. 4 carries a disk 11 which rotates and oscillates with the shaft and is adapted to cooperate during the braking operation with another disk 12 which is faced with a brake lining 13 and is normally positioned in axially spaced relation to the disk 11. The disk 12 is provided with an axially extending stem 14 which is slidably mounted within a sleeve 15 which is journaled within a bracket 16 secured to the motor frame 17. The sleeve 15 is secured by tie bolts 18 to a cap 19 which encloses the outer end of the stem 14, and the cap 19 is provided with a radially extending arm 20 by means of which the cap, together with the sleeve 15, is adapted to be turned a part of a revolution to apply the brake.

The outer end of the sleeve 15 is formed, intermediate the points of attachment of the tie bolts 18, with axially offset surfaces 21 and 22 which are connected by cam surfaces 23. The outer end of the stem 14 is provided with a transversely extending aperture 24, and a pin 25 extends through such aperture and carries rollers 26 at the sides of the stem, which rollers are adapted to bear against the surfaces 22 on the sleeve 15 to hold the brake out of operation. A stiff coil spring 27 is compressed between the outer end of the stem 14 and an adjustably positioned screw plug 28 in the end of the cap 19, and serves to press the disk 12 against the disk 11 when the sleeve 15 is turned approximately a quarter of a revolution from the position shown in Fig. 4 to bring the surfaces 21 on the sleeve in opposition to the rollers 26. The disk 12 is prevented from turning by the provision of dowel pins 29 which are secured to the disk near the periphery of the same and extend into apertures 30 formed in the bracket 16.

The expansion of the spring 27 is sufficient to cause the disk 12 to engage frictionally with the disk 11 and to follow the same in such engagement throughout the oscillation of the latter, the spring 27 compressing and expanding in conformity with the axial movement of the disk 11 during the braking operation and until the shaft 10 is brought to rest. The abruptness with which the braking operation takes place may easily be varied by adjusting the position of the screw plug 28 in the end of the cap 19.

The end of the spring 27 which bears against the outer end of the stem 14 is maintained in centered relation with respect to the same by a stud 31, and the end of the spring which acts against the screw plug 28 bears directly against a centering plate 32 which is made rotatable with respect to the screw plug in order to permit the latter to be turned easily without interference from the spring.

The brake is actuated by movement of a handle 33 which is secured to and forms an extension of the arm 20. When the handle 33 is swung to the right as viewed in Fig. 1, the surfaces 22 on the sleeve 15 which engage with the rollers 26 on the stem 14 to hold the disk 12 away from the disk 11 against the action of the spring 27, are moved out of register with the rollers and the disk 12 is allowed to move into frictional coaction with the disk 11 under the action of the spring.

The sander shown in Figs. 1, 2 and 3 is equipped with three direct motor driven drums, and the drum shafts are provided with individual brakes of the construction hereinbefore described. The motors for the drums are controlled from a switch box 34 which is located at one end of the sander. The switch box is characterized by push plugs 35, 36 and 37, which, upon being pushed in, serve to close the electric circuits of the motors operating the several drums, and by a push plug 38, which, upon being pushed in, serves to operate such switches to open the circuits of the motors operating the drums. The switch box is also characterized by push plugs 39 and 40 which serve respectively to close and open the switch of the motor controlling the feed.

The arms 20 on the brakes associated with the drums are pivotally connected at their outer ends to a link 41, so that when the handle 33 is swung to the right as viewed in Fig. 1, all of the brakes will be operated simultaneously. The link 41 is provided, on the end thereof adjacent the switch box 34, with a shoe 42. A lever 43 is pivoted at 44 to the switch box and is provided at one end with an adjustable set screw 45 which is adapted to be engaged by the shoe 42 on the link 41 when the brakes are applied. The lever 43 is normally held in the position shown in Fig. 3 by a spring 46, and is provided, at the end opposite the set screw 45, with a resiliently yieldable stud 47 which is adapted to engage with and operate the master stop 38 when the brake is applied, thus automatically shutting down the drum motors when the brakes are applied.

While the brake of the invention has been illustrated and described herein in connection with a direct motor drive sander drum, it will of course be appreciated that the brake is also applicable to any sort of rotatable machine element, without regard to the manner in which said element is driven. Likewise, the automatic control arrangement herein illustrated and described, by means of which several brakes are applied in unison and the power employed to drive the rotating elements braked is shut down at the same time, is not limited in its application to machines having direct motor drives.

In multiple drum sanders it is frequently desirable to have one of the drums operate at a higher speed than the other drums. The brake of the invention is well adapted for use in multiple with drums of different speeds because the springs 27 in the different brakes can be adjusted with the screw plugs 28 to give as much or little braking action as is desired in order to cause all of the drums to be brought to rest at substantially the same time irrespective of any differences in the speeds at which they operate.

I claim:

1. In a brake, a disk adapted to be attached to a rotatable element, a second non-rotatable disk movable axially into and out of frictional engagement with the first disk, a spring tending to press the second disk against the first disk, cam rollers connected with the second disk, and a cam member coacting with the rollers to hold the second disk away from the first disk and rotatable to disengage the rollers and permit action of the spring.

2. In a brake, a disk adapted to be attached to a rotatable element, a cam sleeve rotatable a part of a revolution to cause operation of the brake, a second non-rotatable disk movable axially into and out of frictional engagement with the first disk, a stem on the second disk extending through the cam sleeve, rollers carried by the stem for camming engagement with one end of the sleeve, a coil spring compressed against one end of the stem to press the second disk against the first disk, and means for rotating the cam sleeve a part of one revolution to release the rollers from the sleeve and permit frictional engagement of the second disk with the first disk under the action of the spring.

3. In a wood working machine, in combination, a rotating and oscillating sander drum, a disk associated with the drum for rotation and oscillation with the same, a second non-rotatable disk movable axially into and out of frictional engagement with the first disk, an adjustably positioned coil spring for causing the second disk to move into frictional engagement with the first disk and maintain such engagement throughout the oscillation of the first disk when the brake is actuated, and a rotatable cam for normally holding the spring inoperative.

4. In a brake, a disk adapted to be attached to a rotatable element, a second non-rotatable disk movable axially into and out of frictional engagement with the first disk, a spring tending to press the second disk against the first disk, and cam means rotatable to retract the second disk from the first.

5. In a wood working machine, in combination, a rotatable wood working implement, an electric motor arranged in axial alignment with the implement at one end thereof for rotating the latter, a switch in the circuit of the motor operable to shut off the current thereto, a spring-pressed brake arranged in axial alignment with the motor at the end thereof opposite the implement for quickly stopping the rotation of the latter, means for normally holding the brake out of operation, a pivoted hand lever connected with said last mentioned means for releasing the latter to permit the brake to be applied by spring pressure, and means for automatically actuating the switch when the hand lever is swung into braking position.

6. In a wood working machine, in combination, a rotatable wood working implement, an electric motor arranged in axial alignment with the implement at one end thereof for rotating the latter, a switch in the circuit of the motor operable to shut off the current thereto, a spring-pressed brake arranged in axial alignment with the motor at the end thereof opposite the implement for quickly stopping the rotation of the latter, means for normally holding the brake out of operation, a pivoted hand lever connected with said last mentioned means for releasing the latter to permit the brake to be applied by spring pressure, and means for adjusting the pressure applied by the brake.

RICHARD A. WILLIAMS.